United States Patent
Itoga et al.

(10) Patent No.: US 7,322,604 B2
(45) Date of Patent: Jan. 29, 2008

(54) OCCUPANT RESTRAINING APPARATUS

(75) Inventors: Yasuo Itoga, Tokyo (JP); Yoshiki Murakami, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/529,480

(22) Filed: Sep. 29, 2006

(65) Prior Publication Data

US 2007/0080527 A1 Apr. 12, 2007

(30) Foreign Application Priority Data

Oct. 7, 2005 (JP) .............................. 2005-295142

(51) Int. Cl.
- *B60R 21/18* (2006.01)
- *B60R 21/02* (2006.01)
- *B60N 2/42* (2006.01)

(52) U.S. Cl. ................... 280/733; 280/748; 280/728.2; 297/216.1; 296/68.1

(58) Field of Classification Search ............. 280/728.2, 280/748, 733, 730.1; 297/216.1, 284.11; 296/68.1
See application file for complete search history.

(56) References Cited

U.S. PATENT DOCUMENTS

| | | | |
|---|---|---|---|
| 6,715,788 B2 * | 4/2004 | Saiguchi et al. | 280/730.1 |
| 6,863,298 B2 | 3/2005 | Sakai et al. | |
| 2003/0222490 A1 * | 12/2003 | Sakai | 297/216.1 |
| 2004/0100075 A1 * | 5/2004 | Sakai et al. | 280/730.1 |
| 2004/0178616 A1 * | 9/2004 | Yoshikawa | 280/748 |
| 2005/0067209 A1 | 3/2005 | Yoshikawa et al. | |
| 2005/0104341 A1 * | 5/2005 | Sakai | 280/730.1 |
| 2005/0184491 A1 | 8/2005 | Itoga | |
| 2005/0189749 A1 | 9/2005 | Itoga et al. | |
| 2006/0017266 A1 | 1/2006 | Yoshikawa et al. | |

FOREIGN PATENT DOCUMENTS

| | | |
|---|---|---|
| EP | 1 334 883 A1 | 8/2003 |
| EP | 1 371 518 A1 | 12/2003 |
| EP | 1 566 313 A1 | 8/2005 |
| JP | 2002-079861 | 3/2002 |
| JP | 2002-079862 | 3/2002 |
| JP | 2002-079863 | 3/2002 |
| JP | 2003-312439 | 11/2003 |
| JP | 2004-98753 | 4/2004 |
| JP | 2004-106651 | 4/2004 |
| JP | 2005-231504 | 9/2005 |
| JP | 2005-231624 | 9/2005 |

* cited by examiner

*Primary Examiner*—Paul N. Dickson
*Assistant Examiner*—Joselynn Y. Sliteris
(74) *Attorney, Agent, or Firm*—Foley & Lardner LLP

(57) ABSTRACT

A gas generator is arranged in a vacant space around the seat to achieve effective utilization of a space for the seat. An inflatable seat bag is arranged above a seat pan. A seat cushion is installed above the seat bag. A gas introduction port is provided at a longitudinal end (the side of a side frame) of the seat bag, and a gas supply duct from a manifold at a distal end of an inflator is connected to the gas introduction port. The gas supply duct is disposed along the lower side of an S-spring. The inflator is mounted to a spindle with a bracket. A distal end of a gas introduction duct is connected to an end portion of a lap bag on the side of an anchor. A proximal end of the duct is connected to another gas outlet of the manifold.

4 Claims, 5 Drawing Sheets

OCCUPANT RESTRAINING APPARATUS

BACKGROUND

The present invention relates to a passenger restraining apparatus for restraining an occupant on a seat of a vehicle, such as an automotive vehicle, upon collision or the like and, more specifically, to an occupant restraining apparatus configured to inflate a bag with a gas generator upon collision.

As a system for restraining a passenger of an automotive vehicle upon collision, an apparatus that lifts a front portion of a seat cushion upon collision of a vehicle has been proposed in order to prevent a submarine phenomenon that the passenger tends to get through a lower side of a lap belt upon front collision even when a seatbelt is fastened. For example, a vehicle seat which is adapted to push a front end portion of the seat cushion upward by an airbag (seat bag) is described in Japanese Unexamined Patent Application Publication No. 10-217818 ("JP Pub. No. '818"), which is incorporated by reference herein in its entirety.

An airbelt apparatus (inflatable seatbelt apparatus) is publicly known as a passenger restraining apparatus, such as disclosed in, for example, Japanese Unexamined Patent Application Publication No. 2003-312439 ("JP Pub. No. '439"), which is incorporated by reference herein in its entirety. In the airbelt apparatus in the same publication, both a shoulder belt and a lap belt are inflatable. Gas from a gas generator provided in a buckle is introduced into the inflatable shoulder belt and lap belt via a tongue. The tongue and buckle are provided with a gas supply channel for supplying gas from the gas generator to the shoulder belt and the lap belt respectively.

A side airbag apparatus for causing an airbag to be inflated on the lateral side of the passenger is also widely used, such as disclosed in for example, Japanese Unexamined Patent Application Publication No. 10-100828 ("JP Pub. No. '828"), which is incorporated by reference herein in its entirety. In this publication, the gas generator is provided in a seatback.

SUMMARY

One embodiment of the invention relates to an occupant restraining apparatus for restraining an occupant seated on a seat. The occupant restraining apparatus comprises an inflatable bag and a gas generator for inflating the bag. The gas generator is mounted to a rotatable shaft for supporting a seatback of the seat.

Another embodiment of the invention relates to an occupant restraining apparatus for restraining an occupant seated on a seat. The occupant restraining apparatus comprises an inflatable bag formed into an inflatable belt and a gas generator for inflating the bag. The gas generator is mounted above a seat pan of the seat.

Another embodiment of the invention relates to an occupant restraining apparatus for restraining an occupant seated on a seat. The occupant restraining apparatus comprises an inflatable bag formed into an inflatable belt and a gas generator for inflating the bag. The gas generator is mounted under a seat pan of the seat.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
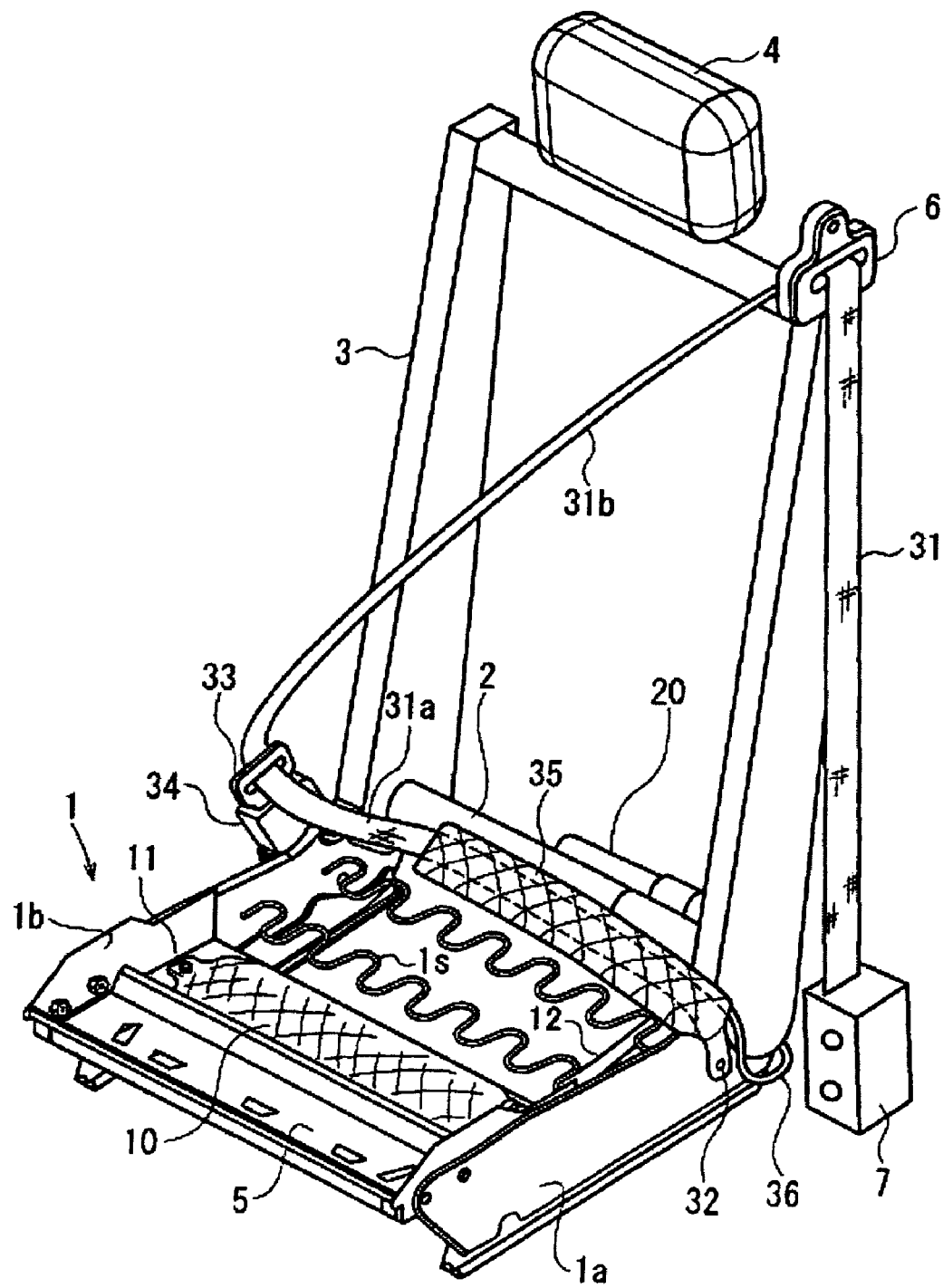
FIG. 1 is a perspective view of a frame of a seat provided with a passenger restraining apparatus according to an embodiment when viewed from the front.

It is an object of the present invention to achieve effective utilization of a space for a seat and in the periphery thereof by arranging a gas generator in a vacant space around the seat.

A passenger restraining apparatus according to a first embodiment is a passenger restraining apparatus for restraining a passenger seated on a seat including an inflatable bag and a gas generator for inflating the bag, characterized in that the gas generator is mounted to a rotatable shaft for supporting a seatback of the seat.

The passenger restraining apparatus according to a second embodiment includes an apparatus similar to the first embodiment and is further characterized in that the bag is at least one of an inflatable belt, a seat bag and a side airbag.

A passenger restraining apparatus according to a third embodiment is a passenger restraining apparatus for restraining a passenger seated on a seat including an inflatable bag formed into an inflatable belt and a gas generator for inflating the bag, characterized in that the gas generator is mounted above a seat pan of the seat.

A passenger restraining apparatus according to a fourth embodiment is a passenger restraining apparatus for restraining a passenger seated on a seat including a inflatable bag formed into an inflatable belt and a gas generator for inflating the bag, characterized in that the gas generator is mounted under a seat pan of the seat.

The passenger restraining apparatus according to a fifth embodiment includes an apparatus similar to the third or fourth embodiment and is further characterized in that a channel for introducing gas from the gas generator includes a recess provided on the seat pan and a lid for covering the recess.

According to the first embodiment, a space around the rotatable shaft for supporting the seatback which is vacant in the related art can be used as a space for installing the gas generator.

As described in the second embodiment, one or more of the inflatable belt (airbelt), the seat bag and the side airbag can be inflated with the gas generator. By inflating two or more of these members by the common gas generator, space saving or reduction of the cost of the parts can be achieved.

According to the passenger restraining apparatus in the third and/or fourth embodiments, the space above or under the seat pan which have not been used in the related art can be effectively used as positions for arranging the gas generator for the inflatable belt.

Although the channel for introducing gas from the gas generator may be a pipe, at least part of the pipe can be omitted with the configuration described in the fifth embodiment.

Referring now to the drawings, embodiments of the present invention will be described below.

Figure 2:
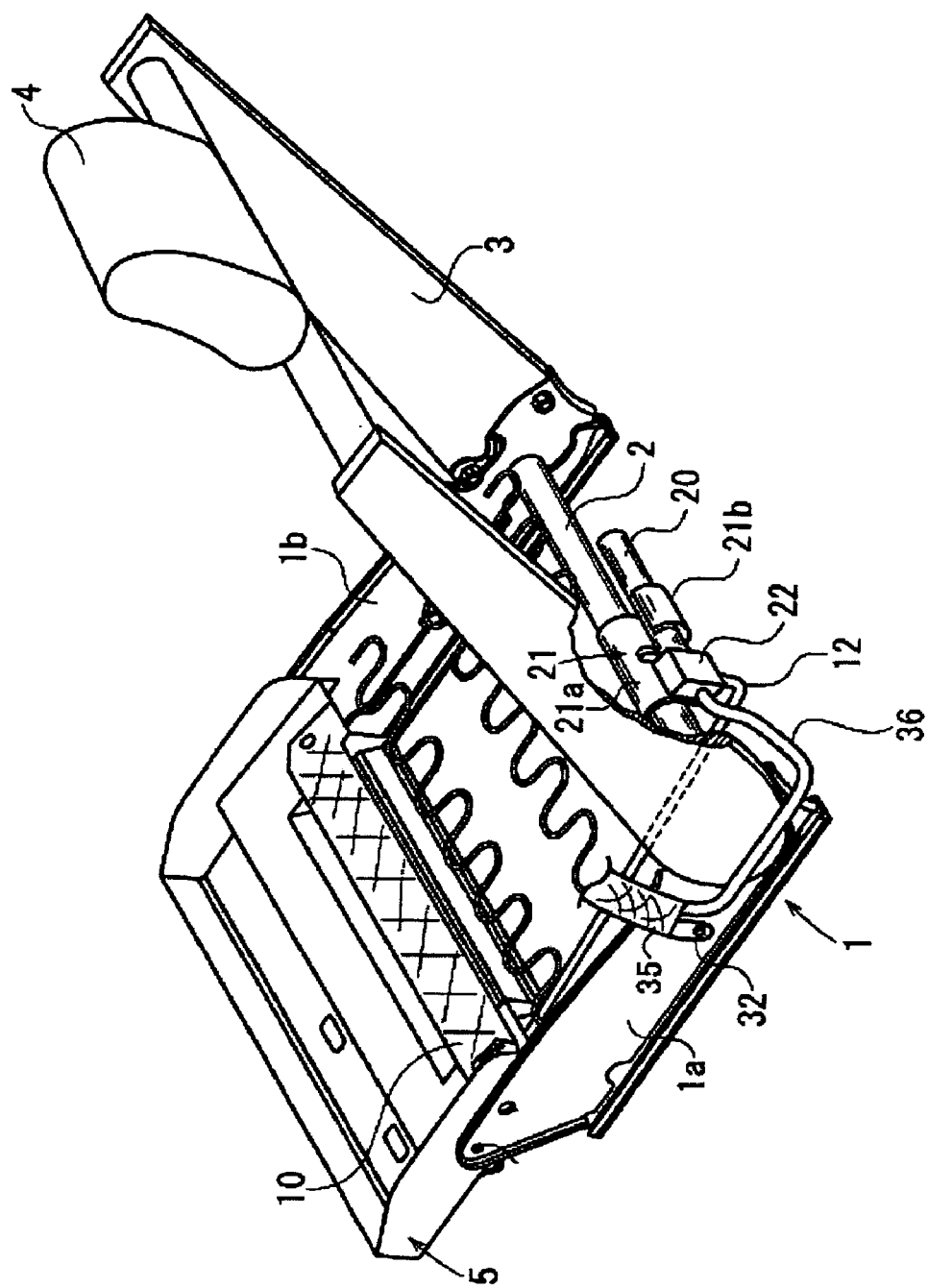
FIG. 2 is a perspective view of the frame of the seat provided with the passenger restraining apparatus of FIG. 1 when viewed from the rear.

FIG. 1 is a perspective view of a frame of a seat of an automotive vehicle provided with a passenger restraining apparatus according to an embodiment when viewed from the front, and FIG. 2 is a perspective view of the same viewed from the rear.

The frame, which constitutes the seat of the automotive vehicle, includes a base frame 1 and a back frame 3 joined to the base frame 1 so as to be capable of rotating via a spindle (rotatable supporting shaft) 2 and a reclining device (not shown). A head rest 4 is mounted to the upper portion of the back frame 3.

The base frame 1 is provided with left and right side frames 1a, 1b and a seat pan 5 extending between front portions of the side frames 1a, 1b. Reference numeral 6 designates a shoulder anchor, and reference numeral 7 designates a seatbelt retractor.

An inflatable seat bag 10 is arranged above the seat pan 5. A seat cushion is installed above the seat bag 10. The seat cushion is not shown in the drawing.

The seat bag 10 extends laterally of the seat. Both longitudinal (lateral) end portions of the seat bag 10 are secured to the seat pan 5 with bolts 11, respectively.

Although not shown in the drawing, the seat bag 10 includes a bag body folded into an elongated shape and a tubular mesh webbing which surrounds the folded body of the bag body. The mesh webbing is formed of a knitted fabric which is expandable in the radial direction, but is minimally expandable in the longitudinal direction (laterally of the seat).

A gas introduction port is provided longitudinally at one end side (on the side of the side frame 1a) of the seat bag 10, and a gas supply duct 12 from an inflator 20 is connected to the gas introduction port. The gas supply duct 12 is provided along the lower side of an S-spring 1s.

The inflator 20 is mounted to the spindle 2 with a bracket 21.

As shown in FIG. 2, the bracket 21 is wound around the spindle 2 at one side 21a, and an inflator holding portion 21b provided on the other side holds the inflator 20.

The bracket 21 is also provided with a manifold 22 for distributing gas, and a gas injection port of the inflator 20 is connected to a gas inlet of the manifold 22. The manifold 22 is provided with two gas outlets and the duct 12 is connected to one of the gas outlets.

A webbing 31 of the seatbelt apparatus is led along a front surface of the back frame 3. The webbing 31 is formed of a non-inflating normal belt material. One end side of the webbing 31 is mounted to the side frame la with an anchor 32. A midsection of the webbing 31 passes through a tongue 33. The other end side of the webbing 31 passes through the shoulder anchor 6 provided on an upper portion of a side surface of a cabin (pillar section or the like), and is connected to the seatbelt retractor 7 so as to be capable of being retracted.

A buckle device 34 to which the tongue 33 is detachably connected is provided on an outer surface of the side frame 1b. The webbing 31 includes a portion on the lap anchor 32 from the tongue 33 which corresponds to a lap portion 31a to be led along a front surface of a lumbar part or an abdominal part of the passenger seated on the seat, and a portion on the side of the shoulder anchor 6 which corresponds to a shoulder portion 31b to be led along the front surface of the upper half body of the passenger in a state in which the tongue 33 is connected to the buckle device 34.

An inflatable lap bag 35 is provided along the lap portion 31a.

The lap bag 35 includes, although not shown, an inflatable bag body arranged along the lap portion 31a and a cylindrical cover that covers the bag body and the lap portion 31a. The bag body is in a state of being folded into a long and flat shape along the lap portion 31a in a normal state. In this embodiment, the cover has a size which fits an outer periphery of the folded body of the bag body when the bag body is in a non-inflated state, and is configured to be expandable in the circumferential direction to accommodate inflation of the bag body when the bag body is inflated.

In this embodiment, the cover is formed of a knitted fabric which is similar to the above-described mesh webbing of the above-described seat bag 10, which is expandable in the circumferential direction but expands little in the longitudinal direction. Therefore, when the bag body is inflated, the mesh of the cover is expanded in the circumferential direction in association with an expansion of the cover in the circumferential direction, and consequently, the longitudinal dimension of the cover is reduced (shortened). Accordingly, the webbing 31 is tensed and hence comes into tight contact with the passenger's body.

It is also possible to connect one end of the lap bag 31 to a distal end of the webbing 31 to secure the other end of the lap bag 35 to the side frame 1a with the anchor.

A distal end of the gas introduction duct 36 is connected to an end portion of the lap bag 35 on the side of the anchor 32. A proximal end of the duct 36 is connected to the other gas outlet of the manifold 22.

Subsequently, an operation of the passenger restraining apparatus will be described.

When the inflator 20 is activated and injects gas in case of emergency, such as vehicle collision, gas from the inflator 20 is branched to the respective ducts 12, 36 and is supplied to the seat bag 10 and the lap bag 35, respectively. Accordingly, the seat bag 10 and the lap bag 35 are inflated.

Since the seat bag 10 is inflated under the seat cushion and pushes the seat cushion upward, the front portion of the seat cushion is pushed upward, or is hardened, so that forward movement of the lumbar part of the passenger can be prevented.

Also, since the length of the lap bag 35 is shortened in association with inflation thereof, the entire webbing 31 is tensed, and comes into tight contact with the passenger's body. Consequently, a portion of the passenger from the femoral region to the lumbar part is strongly restrained to the seat owing to the webbing tightening effect and the sandwiching effect achieved by the front portion of the seat cushion which is pushed upward or hardened by the seat bag 10. In this case, an impact applied to the lumbar part or the abdominal part of the passenger is absorbed by the inflated lap bag 35.

In this passenger restraining apparatus, the inflator 20 is mounted to the spindle 2 as described above, and hence a vacant space around the spindle 2 can be used effectively. In this embodiment, since the single inflator 20 is adapted to inflate the seat bag 10 and the lap bag 35, only one inflator is used, and hence a simple configuration is achieved.

Figure 3:
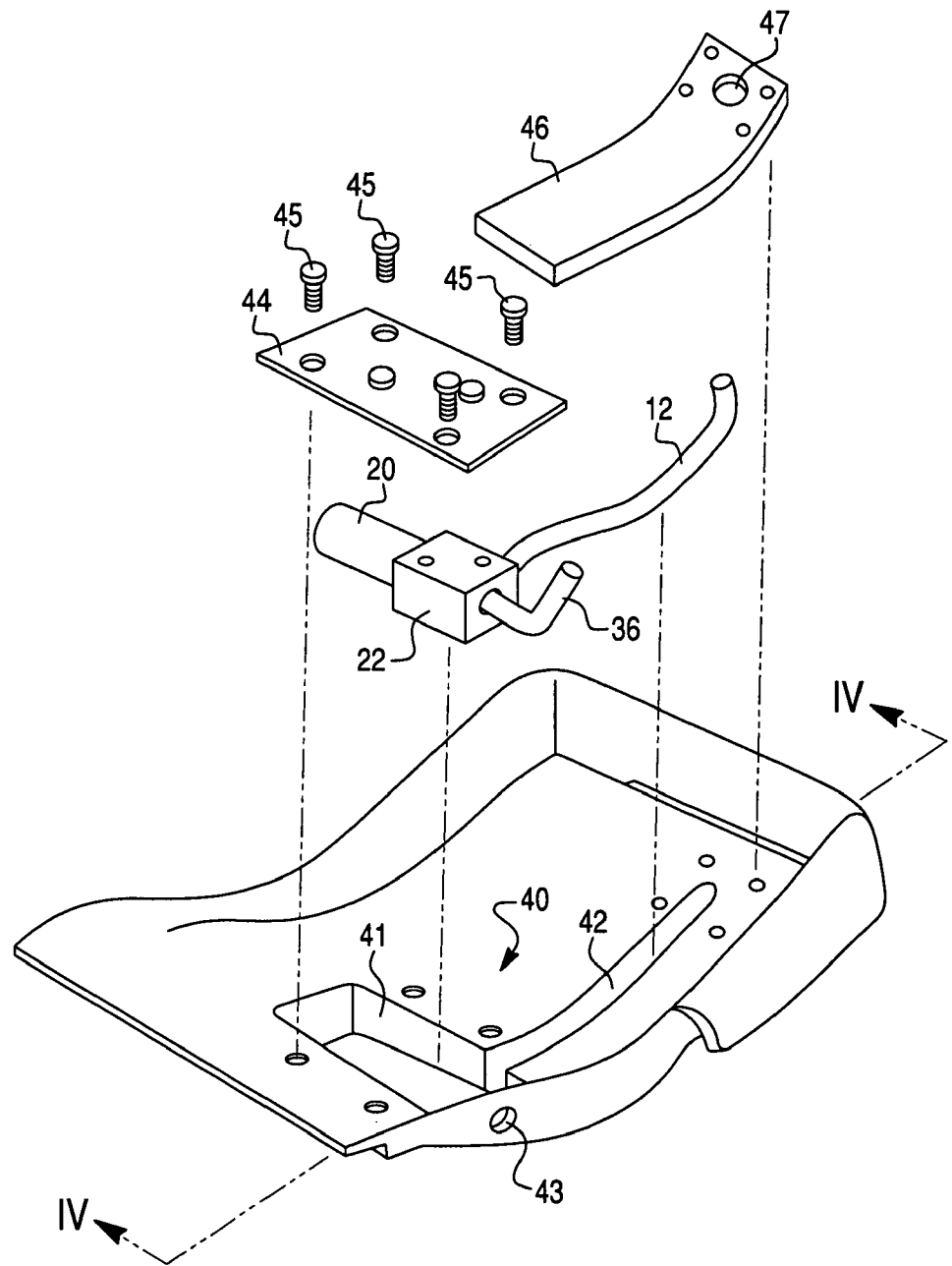
FIG. 3 is an exploded perspective view showing another embodiment.
Figure 4:
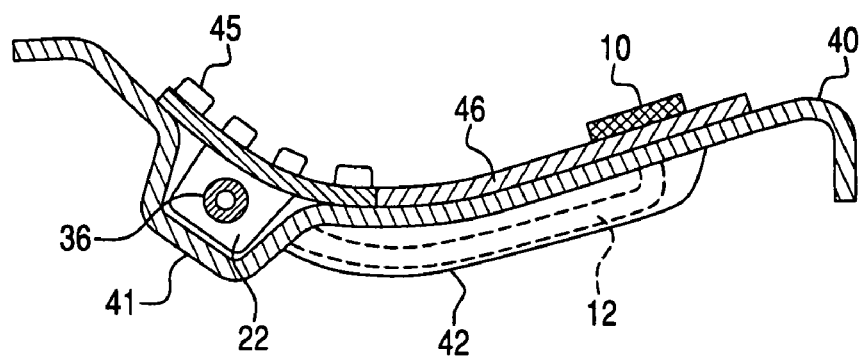
FIG. 4 is a cross-sectional view of the passenger restraining apparatus taken along the line IV-IV in FIG. 3.
Figure 5:
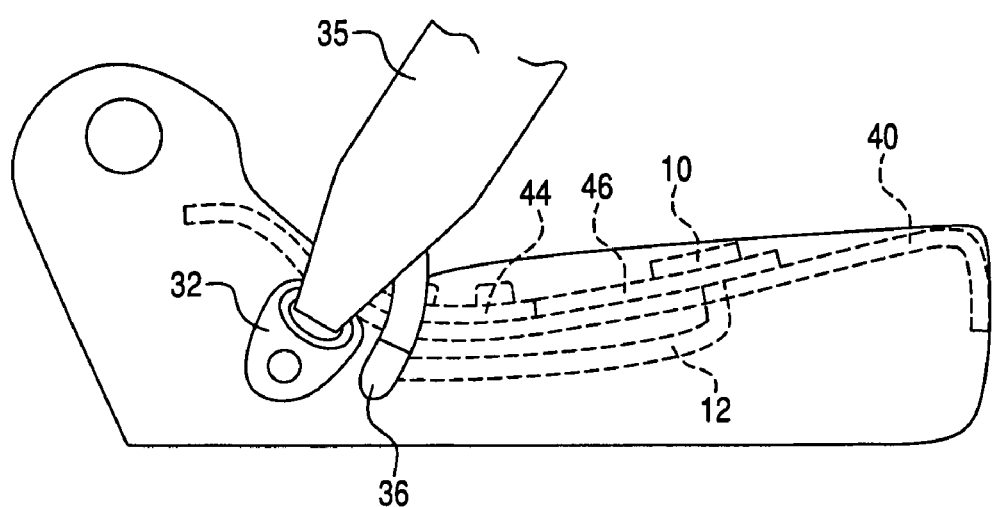
FIG. 5 is a side view of the passenger restraining apparatus in FIG. 3.

Referring to FIG. 3 to FIG. 5, an embodiment in which the inflator 20 is installed above a seat pan will be described.

A first recess 41 for accommodating the inflator 20 and the manifold 22, and a second recess 42 for accommodating the seat bag duct 12 are provided on a seat pan 40. The first recess 41 extends laterally of the seat pan 40, and an insertion hole 43 for inserting the duct 36 for the lap bag 35 is provided so as to face toward a side surface of the seat pan 40.

A lid 44 is mounted to the first recess 41 with bolts 45, and a lid 46 is mounted to the second recess 42 with bolts (not shown). The lid 46 is formed with a hole 47 for allowing passage of a distal end of the duct 12 upward.

When the inflator 20 is activated, the lap bag 35 and the seat bag 10 are inflated. In one configuration, only the lap bag 35 is inflated by gas from the inflator 20.

In FIG. 3, gas from the inflator 20 is introduced to the bag via the ducts 12, 36. However, it is also possible to use the recess 41 or 42 covered with the lid 44 or 46 as a gas passage.

In FIG. 3 to FIG. 5, an upper side of the seat pan which has never been used in the related art is used as a space for installing the lap bag inflator. However, it is also possible to use a lower side of the seat pan 40' as a space for installing the inflator as shown in FIG. 6.

Figure 6:
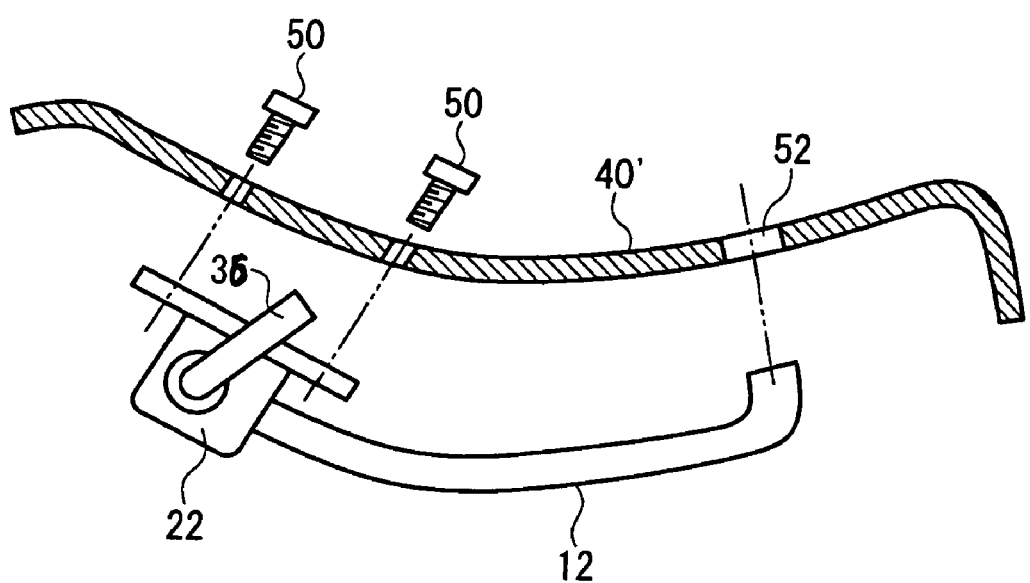
FIG. 6 is an exploded view of still another embodiment.

In FIG. 6, the inflator 20 (not shown in FIG. 6) and the manifold 22 integrated thereto are arranged on the lower side of the seat pan 40', and are fixed to the seat pan 40' with bolts 50. The seat bag duct 12 is led through a hole 52 of the seat pan 40' to the upper surface side. The lap bag duct 36 is led along the side surface of the seat pan 40' upward.

In the case of FIG. 6 as well, the seat bag 10 and the lap bag 35 (both are not shown in FIG. 6) are inflated by the inflator 20. However, it is also possible to configure in such a manner that only the lap bag 35 is inflated by the inflator 20.

In embodiments of the present invention, it is possible to inflate also the side air bag (not shown in the drawing) by the inflator 20. Alternately, the lap bag 35 and the seat bag 10 may be inflated by the separate inflators.

Japan Priority Application 2005-295142, filed Oct. 7, 2005 including the specification, drawings, claims and abstract; is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An occupant restraining apparatus for restraining an occupant seated on a seat, comprising:
   an inflatable bag formed into an inflatable belt;
   an inflatable seat bag; and
   a gas generator for inflating the inflatable belt and the inflatable seat bag,
   wherein the gas generator is mounted above a seat pan of the seat,
   wherein the seat pan includes a first recess for receiving the gas generator and a manifold, and a second recess for receiving a seat bag duct, and
   wherein the seat bag duct is configured to pass inflation gas from the gas generator to the seat bag.

2. The occupant restraining apparatus according to claim 1, further comprising a lid for covering the first and/or second recess.

3. The occupant restraining apparatus according to claim 1, wherein a portion of a belt duct is provided in the first recess, and
   wherein the belt duct is configured to pass inflation gas from the gas generator to the inflatable belt.

4. The occupant restraining apparatus according to claim 1, further comprising a first lid to cover the first recess and a second lid to cover the second recess, and wherein the second lid includes an opening for passage of the seat bag duct.

* * * * *